United States Patent [19]

Taylor et al.

[11] Patent Number: 4,543,607
[45] Date of Patent: Sep. 24, 1985

[54] VIDEO PROCESSORS

[75] Inventors: Richard J. Taylor, London; Paul R. N. Kellar; Stephen P. Greenhalgh, both of Newbury, all of United Kingdom

[73] Assignee: Quantel Limited, Berkshire, England

[21] Appl. No.: 544,916

[22] Filed: Oct. 24, 1983

[30] Foreign Application Priority Data

Oct. 28, 1982 [GB] United Kingdom ............. 8230877

[51] Int. Cl.$^4$ .............................. H04N 9/42; 358 105; 358 11
[52] U.S. Cl. ..................................... 358/140; 358/105
[58] Field of Search ..................... 358/140, 105, 11

[56] References Cited

U.S. PATENT DOCUMENTS

| 4,240,101 | 12/1980 | Michael et al. | 358/140 |
| 4,296,434 | 10/1981 | Drewery | 358/105 |
| 4,335,395 | 6/1982 | Clarke | 358/11 |
| 4,383,272 | 5/1983 | Netravali | 358/105 |
| 4,488,174 | 12/1984 | Mitchell | 358/105 |

FOREIGN PATENT DOCUMENTS 2050109 12/1980 United Kingdom .
2113942 8/1983 United Kingdom .

Primary Examiner—Howard W. Britton
Attorney, Agent, or Firm—Dowell & Dowell

[57] ABSTRACT

A video signal processor for effecting frame rate conversion. A number of framestores connected in series receive incoming video signals under the control of a first generator and are available from the respective fieldstores under the control of a second generator. The presence of respective one line delays allow two adjacent lines from the same field to be available for use by respective multipliers and thence to an adder. A comparator determines if significant movement is present and modifies co-efficients to the multipliers, made available from a co-efficient control so as to allow a single field to pass to the output if desired.

6 Claims, 4 Drawing Figures

4,543,607

VIDEO PROCESSORS

BACKGROUND TO THE INVENTION

This invention relates to a video signal processor for achieving frame or field rate conversion.

In television standards converters there is a requirement to change the number of fields or frames per second from one standard rate to another, or to change the number of lines per field or frame from one standard rate to another, or to change both. One requirement which arises frequently is that of changing from a 525 lines per frame/60 fields per second standard to a 625 lines per frame/50 fields per second standard, or vice versa, both standards having a 2:1 interlace. The present invention is concerned with a processor for changing the field or frame rate.

FIG. 1 shows a selection of fields (a) to (d) reproduced from a sequence of video signals having a 60 Hz field rate and 2:1 interlacing, and a selection of fields (e) to (g) from video signals representing the same scene, but having a 50 Hz field rate, also with 2:1 interlacing. The scene is shown as including an object (h) which moves to take up different positions in successive fields. Periodically one of the 60 Hz fields and one of the 50 Hz fields substantially correspond, so as to represent the scene at substantially the same time. Two such 'coincident' fields are depicted at (a) and (e) and the next two at (d) and (g). If the fields (a) and (e) are both odd line fields, then (assuming the 60 and 50 Hz field rates as stated) the fields (d) and (g) are odd and even line fields respectively, the next two coincident fields are again odd line fields and so on.

Between the pairs of coincident fields, each 50 Hz field represents the scene at a time between two 60 Hz fields, the time differentials changing from field to field in a regular manner. This is illustrated by the two 60 Hz fields (b) and (c) and the 50 Hz field (f) which represents the scene at a time between (b) and (c). In field (f) the moving object should occupy a position between the positions occupied in fields (b) and (c). However, no video signals are available in the nearest 60 Hz field periods, positioned correctly to represent the object (h) as required for field (f).

This kind of difficulty is encountered generally in field rate conversion and it is aggravated by the fact that when generating, say, an odd line field at the converted rate the incoming field with the least positional error may be either an odd line field or an even line field. One approach to the problem is merely to produce signals of the desired field rate by selecting for each outgoing field signals from the incoming fields for which the time differential is least. However, if there is substantial movement in the scene the movement becomes disturbingly uneven after the conversion due to the unequal time differentials.

STATEMENT OF PRIOR ART

In order to reduce disturbing effects of uneven movement, it has been proposed to employ so called 'persistence' techniques and FIG. 2 illustrates a known arrangement employing this technique. As illustrated in FIG. 2 the incoming video signals which will again be assumed to be digital signals of a 60 Hz field rate, are applied to a recursive loop including an adder 11 and a framestore 12. During each frame period, the incoming signals are applied to the adder 11 by way of a multiplier 10, which multiplies the incoming signals by a co-efficient K (less than unity). The produce is applied to one input terminal of the adder 11 and simultaneously there is derived from the framestore 12 corresponding signals resulting from the processing during the previous incoming frame and they are applied to a second multiplier 13 which multiplies the signal by (I-K) and applies the product to the adder 11 to be added to the incoming signal multiplied by K. The resultant sum is in turn fed into the framestore 12. An output port for the framestore allows the stored signals to be read out at the desired outgoing field rate, 50 Hz in this example, to provide the converted signals. With this arrangement, new signals applied to the framestore 11 comprise a proportion of the signals from the current frame of the incoming signals together with progressively decreasing proportions of corresponding signals from preceding frames. If the original scene included movement, the operation of the arrangement diminishes the visibility of uneven movement after field rate conversion. However, the recursive technique gives rise to an unpleasant smearing when movement is present.

Another prior art approach to reducing the visibility of the uneven movement is illustrated in FIG. 3. According to this figure a field store 21 is associated with two multiplying circuits 22 and 23 and an adder 24. Incoming digital video signals are applied in parallel to the field store 21 and a multiplying circuit 22. Signals in the field store are retained for reading out in the next field period when they are applied to the multiplier 23. In the multiplier 22 the incoming signals are multiplied by a predetermined co-efficient $K_A$ and the product is applied to one input of the adder 24. Coincidently, the signals read from the fieldstore are applied to the other multiplier 23 to be multiplied by a co-efficient $K_B$ which may be equal to $(1-K_A)$, and the product is applied to a second input of the adder 24. Each signal read out from the store is arranged to be the signal in the line immediately above (or below) the signal read into the field store at the particular time. The arrangement is not recursive and gives an improved result over the FIG. 2 arrangements. Nevertheless, when there is movement in the scene being televised some smearing still occurs and the combination signals from adjacent lines in two fields reduces the resolution of the system. In practical applications of the FIG. 3 arrangement, the video signals are fed to the multiplier circuits 22 and 23 at the appropriate rate for producing the converted field rate but the means for producing the field rate convertion is not shown in the Figure. It should also be noted that neither FIG. 1 or FIG. 2 illustrates means for achieving line rate conversion.

OBJECT OF THE INVENTION

One object of the present invention is to provide an improved video signal processor and method for effecting frame or field rate conversion, with a view to reducing the visibility of uneveness which tends to be introduced when the video signals portray a moving scene.

SUMMARY OF THE INVENTION

According to the present invention there is provided a video signal processor for effecting field or frame rate conversion comprising, storage means having the capacity to store video signals in a plurality of incoming fields of television signals, input means for writing applied signals in said storage means at a field rate to make video signals in a plurality of said incoming fields available for processing, processing means for deriving video signals from said storage means at a second and dissimilar field rate to generate a plurality of outgoing fields of video signals, said processing means having a first mode of operation in which the video signals forming an outgoing field are derived from video signals taken into said storage means from a single incoming field, said processing means having another mode of operation in which the video signals forming an outgoing field are derived by combining video signals taken into said storage means from a plurality of incoming fields, means for comparing video signals in different fields to indicate whether or not there was substantial movement in the televised scene, means for selecting the first mode of operation of said processing means in response to an indication of no substantial movement from said comparing means, and means for selecting the other mode of operation of said processing means in response to an indication of substantial movement from said comparing means.

Further according to the invention there is provided a video signal processor for effecting scan rate conversion comprising, storage means having the capacity to store video signals in the plurality of area scans of a scene, input means for writing applied signals in said storage means at a first area scan rate to make video signals in a plurality of area scans available for processing, processing means for deriving video signals from said storage means at a second and dissimilar area scan rate to generate a plurality of outgoing area scans of video signals, said processing means having a first mode of operation in which the video signals forming an outgoing area scan are derived from video signals taken into said storage means from a single incoming area scan, said processing means having another mode of operation in which the video signals forming an outgoing area scan are derived by combining video signals taken into said storage means from a plurality of incoming area scans, means for comparing video signals in different area scans to indicate whether or not there was substantial movement in the scene, means for selecting the first mode of operation of said processing means in response to an indication of no substantial movement from said comparing means, and means for selecting the other mode of operation of said processing means in response to an indication of substantial movement from said comparing means.

According to a further aspect of the invention there is provided a method of processing video signals for effecting field or frame rate conversion comprising, storing video signals incoming at a first field rate to make video signals in a plurality of incoming fields available for processing, deriving video signals from said storage means at a second and dissimilar field rate to generate a plurality of outgoing fields of video signals, in either of two modes, in one of which an outgoing field is derived from video signals stored from a single incoming field, and in the other field of which an outgoing field is derived by combining video signals stored from a plurality of incoming fields, comparing video signals in different fields to indicate whether or not there was substantial movement in the scene, selecting said first mode of operation in response to an indication of no substantial movement from said comparison and selecting said other mode of operation in response to an indication of substantial movement from said comparison.

BRIEF DESCRIPTION OF THE DRAWINGS

The invention will now be described by way of example with reference to the accompanying drawings in which.

DESCRIPTION OF PREFERRED EMBODIMENTS

Figure 1:
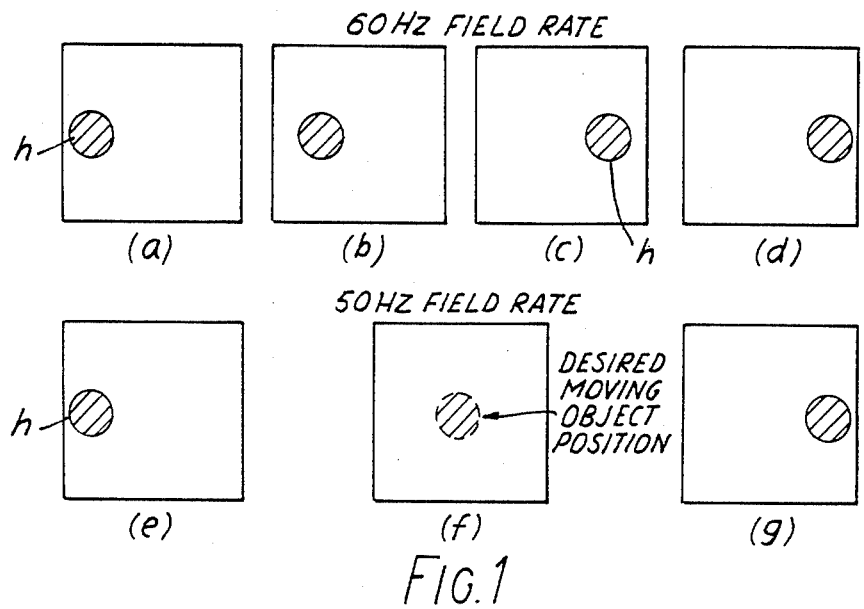
FIG. 1 shows images reproduced from the television signals having different field rates.
Figure 2:
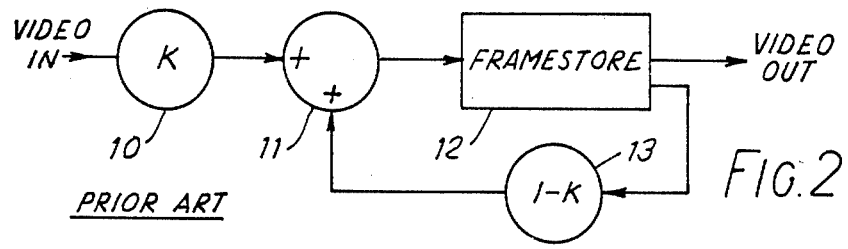
FIG. 2 shows one known arrangement utilised in frame rate conversion.
Figure 3:
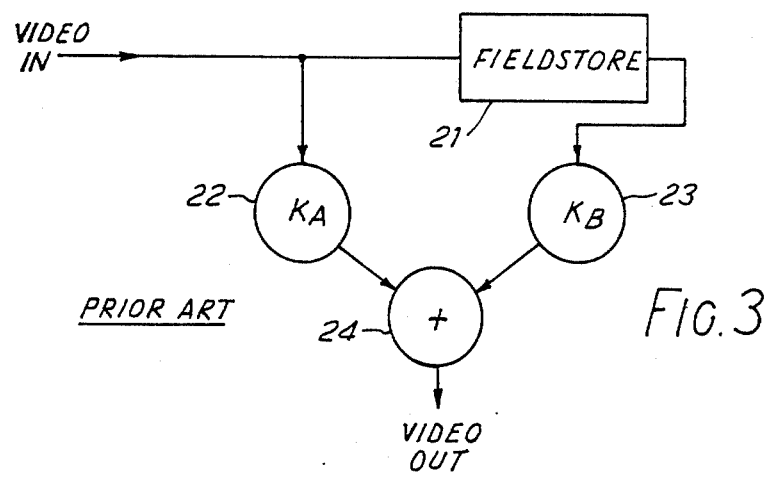
FIG. 3 shows an alternative known arrangement.
Figure 4:
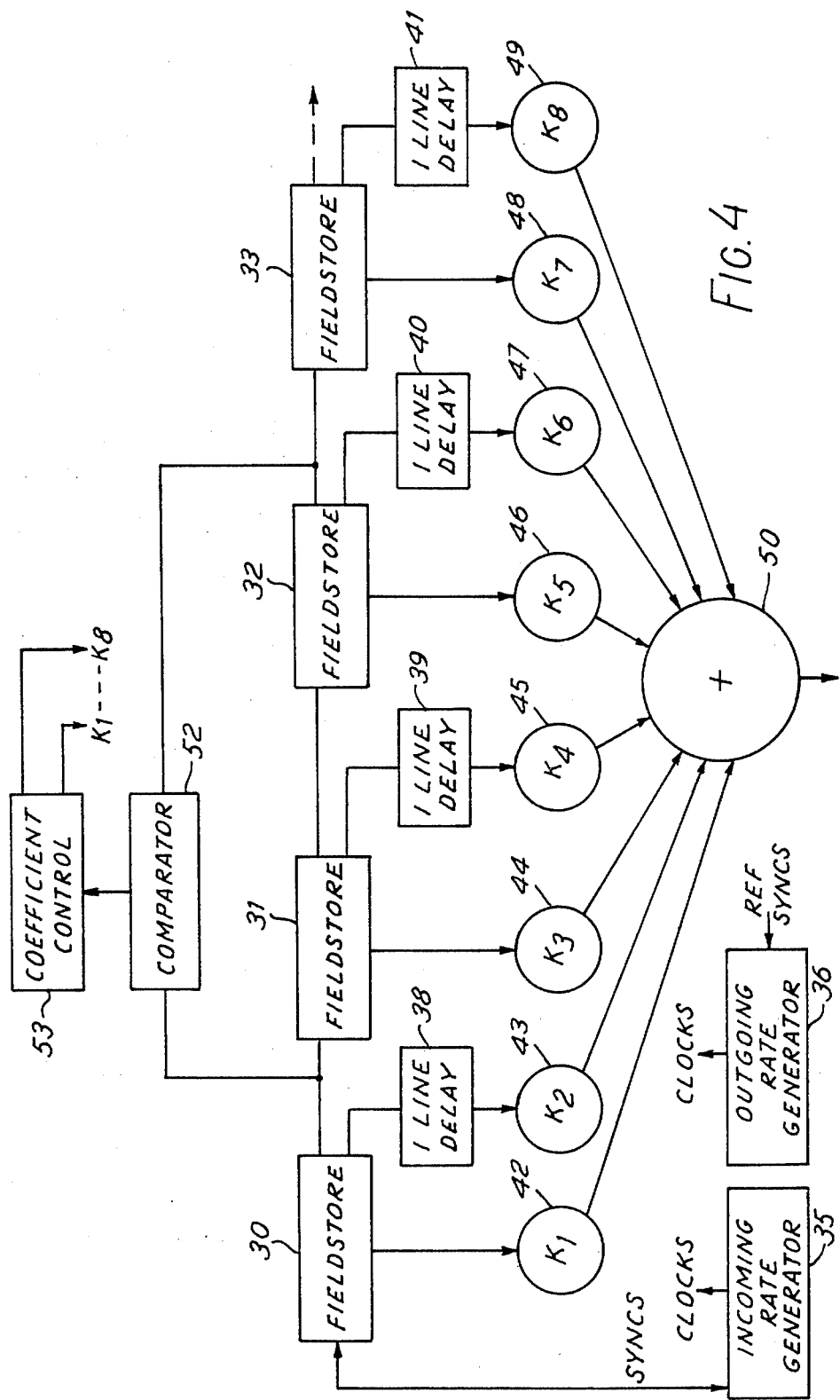
FIG. 4 shows an embodiment of a processor according to the present invention.

The processor illustrated in FIG. 4 comprises four field stores 30–33 and successive fields of incoming video signals are written into the store so as to be available for use by respective ones of eight multipliers 42–49. The outputs of the multipliers are fed to a single adder 50, the output of which provides the signals of the converted field rate. As shown, the output of each field store is applied to two respective multipliers, in one case directly and in the other case via a one-line period delay, as denoted by the references 38–41. Therefore video signals can be applied concurrently to the adder 50 from two adjacent lines in the field of signals stored in the respective store at any one time, to synthesise one interlaced line of an alternate field. The multipliers 42–49 multiply the video signals applied to them by respective co-efficients denoted in the drawings as $K_1$ to $K_8$. The two co-efficients for any one field store, for example $K_1$ and $K_2$ for field store 30, achieve an averaging effect when it is desired to synthesise an interlaced lined as referred to above.

In practice, the values of the co-efficients $K_1$ to $K_8$ used at any time are chosen in dependence on the time differentials between the outgoing field being manipulated and the incoming fields from which it is being synthesised. The rate at which data is written into the stores 30–33 is controlled in a generator 35 which produced write clock pulses and is locked to incoming syncs. The read out rate from the stores 30–33 is, in turn, determined by the generator 36 which produces read clock pulses and is locked to local reference syncs.

A comparator 52 is provided which compares video signals output from field store 30 with video signals from field store 32 and co-operates with co-efficient control 53 which may include a lock-up table for values of K, to select the one or more co-efficients $K_1$ to $K_8$ depending on whether the comparator 52 detects interframe movement or not. Typically, when no interframe movement is detected, one co-efficient K is made equal to 1 and the remaining co-efficients are made equal to zero. In this case the output from the adder 50 is solely derived from the field store for which the co-efficient K is unity. If interframe movement is occurring, co-efficients K are selected to interpolate between two incoming fields producing an output field which simulates the scene at the appropriate time between the two incoming fields. Averaging is effected by the one line delay (say 38) and the two multipliers (say 42 and 43) for one of the two field stores used for interpolation, when picture movement is present, so that the interpolation is carried out between lines of the kind (odd or even) required for the outgoing field. The effect of the averaging, together with any smearing due to the interpolation is less objectionable to the human eye when the scene contains movement, than the uneven movement which is more noticeable otherwise. Slight softening of the picture reproduced from the signals coming from the adder 50 will however occur due to the averaging effect. Interpolation of more than two fields may be allowed for, if desired, by increasing the number of field-stores and relating circuit elements.

The circuit illustrated has the advantage of flexibility and by way of example one mode of converting from a field rate of 60 Hz to one of 50 Hz will be described. It will be assumed that the video signals in a 60 Hz field are in process of being written into field store 30 and that video signals from preceding 60 Hz fields are held in field stores 31, 32 and 33. Assume also, in the first instance, that no substantial movement in the scene is detected by the comparator 52.

On these assumptions, video signals are read at the 50 Hz field rate from field store 31 or 32, say store 31, the co-efficient $K_3$ being selected to be unity by the control 53, and all other co-efficients being zero. If, however, substantial movement has been detected by the comparator 52 the video signals at the 50 Hz rate are generated by interpolation between field stores 31 and 32. To achieve this the control 52 again selects the co-efficient $K_4$ to be zero but now selects $K_3$ to have a value appropriate to the time differential between the 50 Hz field being synthesized and the 60 Hz field in the store 31. The control 53 also selects the co-efficients $K_5$ and $K_6$ to be each one half of the complement of $K_3$. Interpolation is carried out between the signal elements of the lines in store 31 and the signal elements of the equivalent lines synthesised by averaging the lines immediately above and below in field store 32. The store (31 or 32), of which the output is averaged, depends on which one contains the same lines (odd or even) as the field to by synthesised. Before the synthesis of the 50 Hz field is completed, a new 60 Hz field may start and this new field is read into field store 33 leaving the signals in 30 and 31 available for synthesising the next 60 Hz field. Preferably the co-efficient control 53 is set up to store a range of co-efficients for the multiplers 42–49 sufficient to cover the range of time differentials which may occur between the 50 Hz fields and the 60 Hz fields from which they are interpolated, the control 53 being arranged to select the co-efficient and its complement, corresponding to the time differentials for the field being generated. The appropriate time differential for each field can be evaluated by comparing the incoming syncs with the local reference syncs.

When there is substantial coincidence between a 60 Hz field and a 50 Hz field, interpolation is dispensed with even if there is movement in the scene, since the co-efficient K would be unity. Averaging may, however, be affected if one of these fields is an odd line field and the other an even line field.

If line rate conversion is also required, as will usually be the case, suitable means for performing this conversion may be connected to the arrangements shown in FIG. 4, operating on either the incoming signals or the outgoing signals. The invention is not confined to converting the field rate from 60 Hz to 50 Hz; it can also be employed for the inverse conversion and for other conversions from one field rate to another. It will be understood that there will be a time lag between the incoming fields and the respective outgoing fields and indeed the arrangement need not operate in real time. The references herein to time differential refer to the time interval between different views of the original scene being televised.

The invention could also be applied if the field stores such as 30 to 33 are replaced by framestores.

We claim:

1. A video signal processor for effecting field or frame rate conversion comprising:

storage means having the capacity to store video signals in a plurality of incoming fields of television signals;

input means for writing applied signals in said storage means at a first field rate to make video signals in a plurality of said incoming fields available for processing;

processing means for deriving video signals from said storage means at a second and dissimilar field rate to generate a plurality of outgoing fields of video signals;

said processing means having a first mode of operation in which the video signals forming an outgoing field are derived from video signals taken into said storage means from a single incoming field;

said processing means having another mode of operation in which the video signals forming an outgoing field are derived by combining video signals taken into said storage means from a plurality of incoming fields;

means for comparing video signals in different fields to indicate whether or not there was substantial movement in the televised scene;

means for selecting the first mode of operation of said processing means in response to an indication of no substantial movement from said comparing means; and means for selecting the other mode of operation of said processing means in response to an indication of substantial movement from said comparing means.

2. A processor according to claim 1 in which said processing means, in said other mode, is arranged to derive the video signals forming an outgoing field by combining the video signals in two lines of one incoming field, with video signals in the interlaced line in an adjacent incoming field.

3. A processor according to claim 1 in which said processing means comprises means for multiplying video signals taken into the storage means from different incoming fields by respective co-efficients, means for adding the products, and means from which co-efficients of different values, including zero, can be selected to change the mode of operation of said processing means in response to indications given by said comparing means.

4. A processor according to claim 1 in which selected co-efficients are related to the time differentials between the outgoing field and the respective incoming fields.

5. A video signal processor for effecting scan rate conversion comprising:

storage means having the capacity to store video signals in the plurality of area scans of a scene;

input means for writing applied signals in said storage means at a first area scan rate to make video signals in a plurality of area scans available for processing;

processing means for deriving video signals from said storage means at a second and dissimilar area scan rate to generate a plurality of outgoing area scans of video signals;

said processing means having a first mode of operation in which the video signals forming an outgoing area scan are derived from video signals taken into said storage means from a single incoming area scan;

said processing means having another mode of operation in which the video signals forming an outgoing area scan are derived by combining video signals taken into said storage means from a plurality of incoming area scans;

means for comparing video signals in different area scans to indicate whether or not there was substantial movement in the scene;

means for selecting the first mode of operation of said processing means in response to an indication of no substantial movement from said comparing means; and means for selecting the other mode of operation of said processing means in response to an indication of substantial movement from said comparing means.

6. A method of processing video signals for effecting field or frame rate conversion comprising:

storing video signals incoming at a first field rate to make video signals in a plurality of incoming fields available for processing;

deriving video signals from said storage means at a second and dissimilar field rate to generate a plurality of outgoing fields of video signals, in either of two modes;

in one of which an outgoing field is derived from video signals stored from a single incoming field, and in the other of which an outgoing field is derived by combining video signals stored from a plurality of incoming fields;

comparing video signals in different fields to indicate whether or not there was substantial movement in the scene;

selecting said first mode of operation in response to an indication of no substantial movement from said comparison; and selecting said other mode of operation in response to an indication of substantial movement from said comparison.

* * * * *